United States Patent
Vedas et al.

(10) Patent No.: US 10,325,238 B1
(45) Date of Patent: Jun. 18, 2019

(54) TRANSFORMABLE SHIPPING CONTAINERS

(71) Applicant: Amazon Technologies, Inc., Seattle, WA (US)

(72) Inventors: Brett Arthur Vedas, Chandler, AZ (US); Jonathan Hohle, Scottsdale, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 526 days.

(21) Appl. No.: 15/060,335

(22) Filed: Mar. 3, 2016

(51) Int. Cl.
*G06Q 30/00* (2012.01)
*G06Q 10/08* (2012.01)
*G06Q 30/06* (2012.01)
*B65D 75/58* (2006.01)

(52) U.S. Cl.
CPC ......... *G06Q 10/083* (2013.01); *B65D 75/585* (2013.01); *B65D 75/5816* (2013.01); *B65D 75/5833* (2013.01); *G06Q 30/0635* (2013.01)

(58) Field of Classification Search
CPC .... B65D 81/36; B65D 81/361; B65D 81/365; B65D 81/368; B65D 75/5816; B65D 75/5833; B65D 75/585; G06Q 10/083; G06Q 30/0635
See application file for complete search history.

(56) References Cited

U.S. PATENT DOCUMENTS

| | | | | |
|---|---|---|---|---|
| 1,932,368 A * | 10/1933 | Bowman | ................ | A63H 33/16 229/103 |
| 2,551,089 A * | 5/1951 | Behrens | ................ | B65D 81/36 206/765 |
| 3,195,265 A * | 7/1965 | Marquez | .............. | B65D 81/365 206/225 |
| 4,807,808 A * | 2/1989 | Reed | ....................... | A01K 1/033 119/168 |
| 4,992,068 A * | 2/1991 | Conrad | ................... | A63H 33/00 229/122 |
| 5,358,172 A * | 10/1994 | Hollander | ............. | B65D 81/368 206/457 |
| 2002/0111106 A1* | 8/2002 | Bollman | .................. | A63H 3/52 446/71 |
| 2003/0035138 A1* | 2/2003 | Schilling | .............. | G06Q 10/087 358/1.15 |
| 2005/0004878 A1* | 1/2005 | Malone | .............. | G06Q 30/0283 705/400 |

(Continued)

OTHER PUBLICATIONS https://www.geek.com/geek-cetera/coca-cola-experiments-with-turning-packaging-into-a-vr-headset-1648223/ (Year: 2016).*

*Primary Examiner* — Matthew E Zimmerman
(74) *Attorney, Agent, or Firm* — Kilpatrick Townsend & Stockton LLP

(57) ABSTRACT

Methods for fulfilling and shipping customer orders include selecting a transformable shipping container. The particular transformable shipping container can be selected based on various attributes of the customer, including selections or preferences indicated by the customer. Transformable shipping containers can include outer packaging with varying combinations of transformation instructions, extra parts, delineated fold and cut lines, perforations, and other suitable demarcations for enabling a customer to readily convert the transformable shipping container into a useful item, accessory or toy.

21 Claims, 15 Drawing Sheets

(56) References Cited

U.S. PATENT DOCUMENTS

| | | | | |
|---|---|---|---|---|
| 2006/0219764 A1* | 10/2006 | Copeman | ............... | A63G 17/00 |
| | | | | 229/116.1 |
| 2008/0110712 A1* | 5/2008 | Strong | ................... | A47B 61/06 |
| | | | | 190/13 R |
| 2009/0209166 A1* | 8/2009 | Chen | ..................... | A63H 33/008 |
| | | | | 446/75 |
| 2010/0223890 A1* | 9/2010 | Anderson | ............ | B65D 5/5035 |
| | | | | 53/456 |
| 2012/0072011 A1* | 3/2012 | Sarma | .................... | G06F 3/1205 |
| | | | | 700/216 |
| 2013/0153647 A1* | 6/2013 | Lewis | ................. | B65D 5/0236 |
| | | | | 229/103 |
| 2014/0001080 A1* | 1/2014 | Perez | ..................... | B65D 79/00 |
| | | | | 206/579 |

* cited by examiner

TRANSFORMABLE SHIPPING CONTAINERS

BACKGROUND

Conventional methods of packaging and shipping products to a customer typically involve packaging one or more individual products into a shipping container (e.g., cardboard box). The shipping container can contain any number of inner packages containing products, as well as various forms of dunnage for protecting the inner packages and individual products. Such shipping containers may be stackable, robust against impact or crushing, sealable, and able to retain an interior load while being lifted, among other attributes. After delivery and unpacking of the one or more individual products from the shipping container, the shipping container is typically discarded or recycled.

BRIEF DESCRIPTION OF THE DRAWINGS

Various embodiments in accordance with the present disclosure will be described with reference to the drawings, in which.

DETAILED DESCRIPTION

Figure 1:
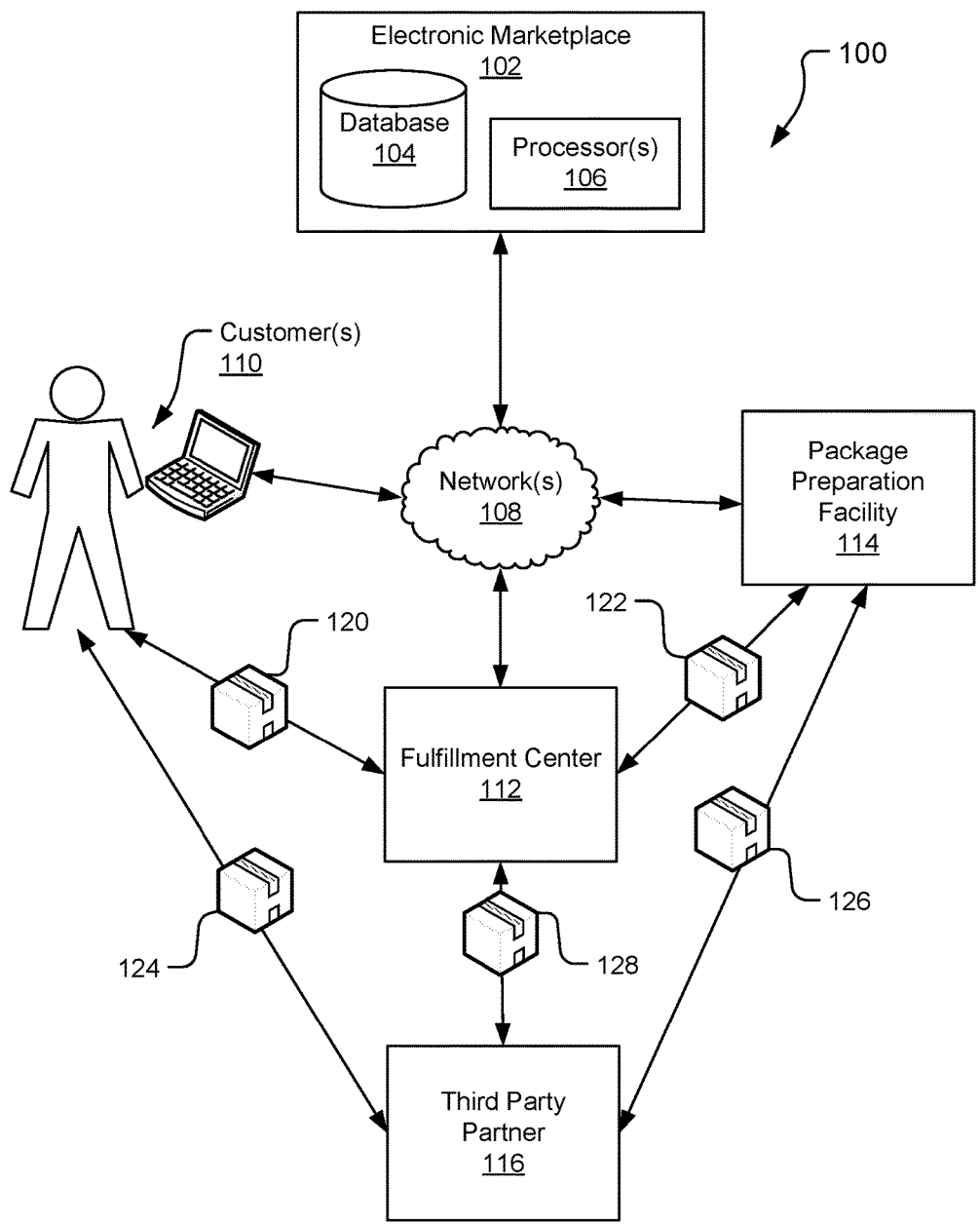
FIG. 1 is a block diagram of an example system for fulfilling of an order from a user including shipping products to the user via a transformable shipping container.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments described herein relate to transformable shipping containers and systems for selecting transformable shipping containers. Specifically, features herein relate to various forms of transformable shipping containers that provide additional value to customers receiving products within the containers, as well as systems for use in conjunction with an electronic marketplace for selecting transformable container options based on the customer and/or the order. A transformable shipping container can be used in place of a conventional shipping container to facilitate the transport of single or multiple individual items in an order without significantly impairing the functional characteristics of the transformable shipping container relative to a conventional shipping container. Once received, the transformable shipping container can be transformed by a recipient into a transformed state that provides additional value to the customer. For example, the transformable shipping container can include any suitable combination of instructions, perforations, cut guide lines, fold lines, additional parts, decoration, or other suitable attribute(s) to facilitate the transformation. The specific selection of transformable shipping container can be based on some portion of products shipped therein; or the selection of the transformable shipping container can be entirely decoupled from the selection of products. In general, a transformable shipping container can be used to replace any conventional shipping container of similar size.

A transformable shipping container can be configured to be transformed in a variety of ways. For example, some transformable shipping containers can utilize subtractive modeling, such that a transformed state is formed by removing some material from a shipping container. In some cases, a transformable shipping container can include parts that can be removed from surfaces of the container for assembly into items while a remainder of the transformable shipping container can be discarded. In some cases, surface features or printed features on surfaces of the transformable shipping container can be co-located with prominent portions of the items or the transformed state, such that the surface or printed features of the container remain prominent on the transformed state.

Systems for use in conjunction with the online marketplace can select a transformable shipping container for use in shipping an order depending on attributes of the customer placing the order and/or based on the order itself. For example, different transformable shipping container options can be available in different sizes, depending on the size of shipping container required to fulfill an order. By way of another example, an attribute of a customer can include a saved selection indicating a preference regarding transformable containers. The saved selection might indicate that a transformable container should be utilized whenever a suitable order is placed. By way of yet another example, an attribute of a customer can include information about past orders by the customer, and/or attributes inferred from the information. By way of a specific example, a customer can have an order history indicating that the customer has small children. If the customer having small children places an order via an electronic marketplace for a large item, such as an item of furniture, an order fulfillment system can detect the above parameters and determine that a transformable shipping container should be used that transforms into a toy for small children. The order fulfillment system can further determine that a shipping container of a particular size range should be used to fulfill the furniture order, and can select a transformable container from among transformable container options in that size range. A suitable transformable container option in this example may be a large box that converts readily into a toy playhouse. Therefore, the system can generate instructions to package the order inside the selected transformable shipping container, which may be subsequently shipped to the customer.

FIG. 1 illustrates an example of a logistical system 100 that can facilitate the receipt of orders by a customer 110 and the fulfillment of the orders to the customer via a fulfilment center 112 or a third party partner 116, in accordance with embodiments. The system 100 includes an electronic marketplace 102, which can communicate via a network 108 with the customer 110 which can be any user of the electronic marketplace, an order fulfillment center 112, and a package preparation facility 114. In some cases, the electronic marketplace 102 may also communicate via the network 108 with the third-party partner 116.

In various embodiments, the customer 110 can communicate information regarding an order to the electronic marketplace 102, which can include a processor 106 and database 104 for electronically managing orders and customer information. The information can indicate a preference or selection from the customer that indicates the use of transformable shipping containers. The electronic marketplace 102 can facilitate communication with the fulfilment center 112, third party partner 116, and package preparation facility 114. For example, upon receipt of an order by a customer 110, the electronic marketplace 102 can designate a transformable shipping container for use in fulfilling the order. In some embodiments, such as where the contents of the order are under the control of a fulfilment center 112 associated with the electronic marketplace 102, the electronic marketplace can communicate instructions to the fulfilment center 112 to use a selected transformable shipping container, and to ship the order via the transformable shipping container 120 to the customer. In some cases, providing the selected transformable shipping container to the customer can include the electronic marketplace 102 communicating with a package preparation facility 114 to prepare the transformable shipping container according to the selection and send the prepared transformable shipping container 122 to the fulfilment center 112 for use. Transformable shipping containers can be prepared ahead of time, or in some cases, may be dynamically prepared according to need. In some cases, a third party partner 116 can be associated with the electronic marketplace 102 or may be used in lieu of the fulfilment center 112 for facilitating the delivery of an order to the customer 110, in which case, the third party partner 116 can facilitate shipment of the order via a transformable shipping container 124 to the customer 110. As described above with respect to the fulfilment center 112, the third party partner 116 can prepare the transformable shipping container or can receive a transformable shipping container 126 from the package preparation facility 114. Some part or all of an order can be shipped 128 between the fulfilment center 112 and the third party partner 116 for consolidating an order into a transformable shipping container.

FIGS. 2-11 illustrate some non-limiting examples of transformable shipping containers that can be selected for use in shipping a customer order based on various attributes of the customer order and/or the customer. It will be apparent that other suitable transformable shipping containers can be used beyond the embodiments described herein.

Figure 2:
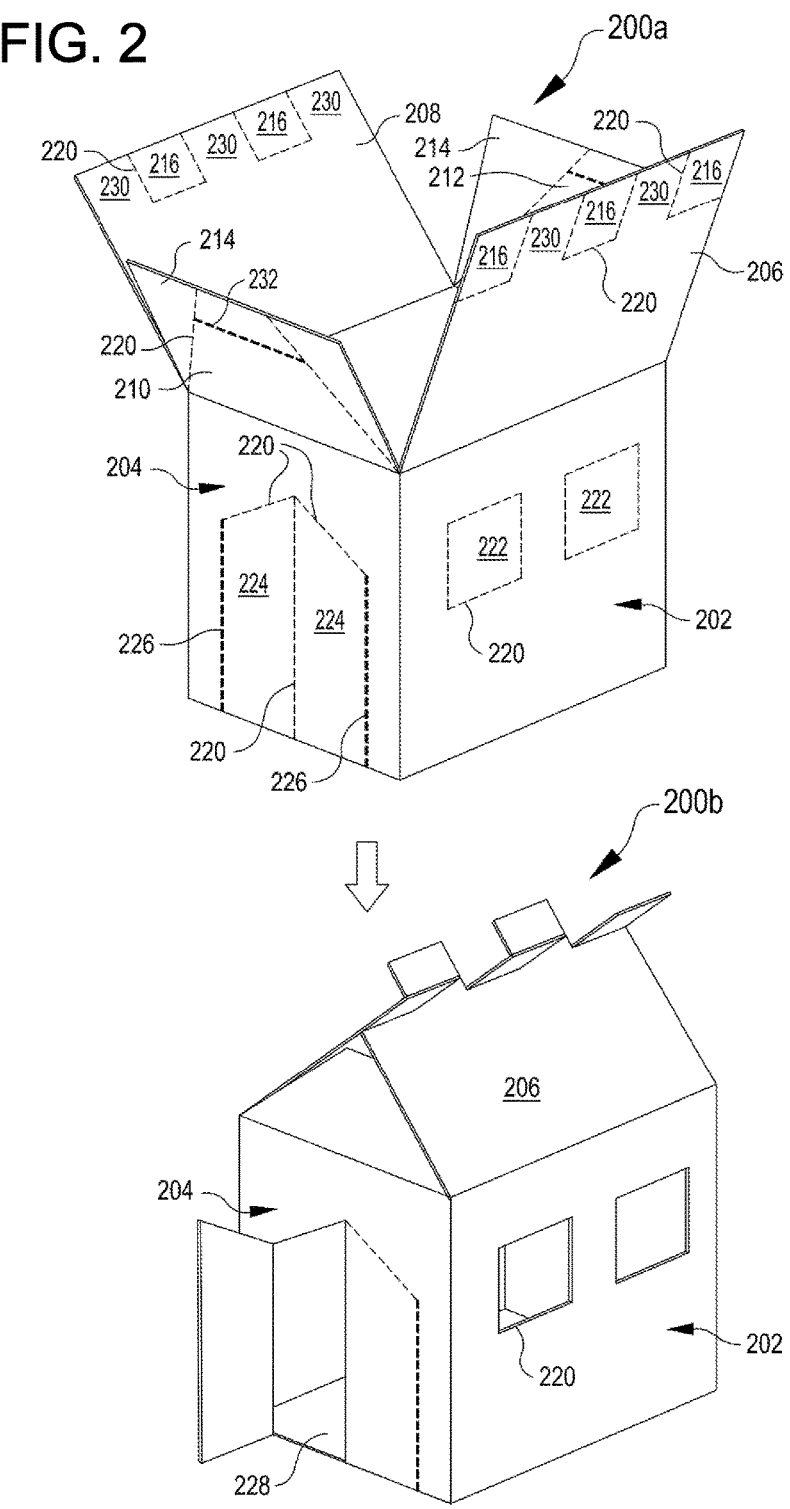
FIG. 2 illustrates a transformable shipping container configured to be transformed into a play structure.

FIG. 2 illustrates a transformable shipping container 200a, which is configured to be transformed into a child's play structure 200b, such as a play house. The transformable shipping container 200a includes walls 202, walls 204, short closure flaps 210 and long closure flaps 206. In some cases, the long closure flaps 206 are elongated beyond a length of a typical shipping container in order to facilitate structural elements of the transformed state 200b. In various other embodiments of transformable shipping containers, various aspects of the transformable shipping container can likewise be longer or shorter than conventional parts of shipping containers to similarly facilitate transformation into a transformed state. The transformable shipping container 200a can include an interior surface 208, which may include demarcations or decorations intended to illustrate an interior 228 of a play structure, such as illustrations of furnishings or interior walls. The interior surface 208 can also include printed instructions or diagrams for performing the transformation, and can include markings defining fold lines, perforations, or cut lines for facilitating the transformation.

In accordance with embodiments, the transformable shipping container 200a can include modifiable surfaces. For example, on the short closure flaps 210, cut lines or perforations 220 and fold lines 232 may provide for the conversion of the rectangular short closure flap 210 into a trapezoidal shape suitable for forming an interior of a peaked roof. On the long flaps 206, alternating sets of cut lines or perforations 220 can facilitate the creation of interlocking teeth 230 by facilitating the removal of a set of removable sections 216. On a first wall 202 of the transformable shipping container, removable panels 222 may be cut or punched out of the first wall along cut lines or perforations 220 to form windows. On a second wall 204 of the transformable shipping container, swinging doors 224 can be formed via a series of cut lines or perforations 220 defining the separation between the doors and between the doors and second wall 204. The doors 224 may be opened along a set of fold lines 226. In some cases, fold lines 226 may include shallow grooves or perforations that facilitate swinging of the doors 224, so as to provide access to an interior 228 of the play structure 200b.

Figure 3:
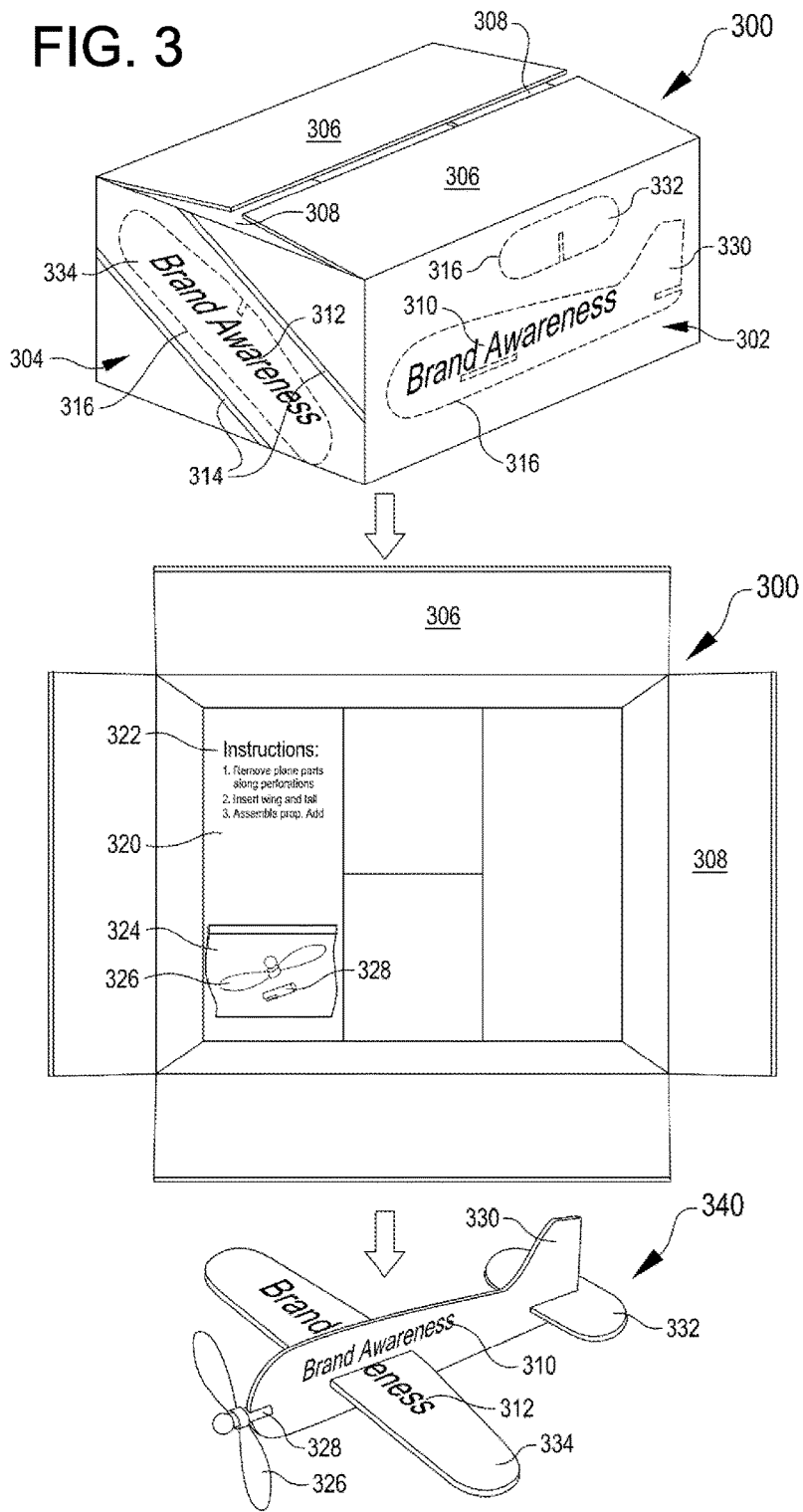
FIG. 3 illustrates a transformable shipping container configured to be transformed into a toy.

FIG. 3 illustrates another transformable shipping container 300, which can be transformed into a toy 340, e.g. a toy airplane. The transformable shipping container 300 includes first sides 302, second sides 304, exterior flaps 306, and interior flaps 308. The sides 302, 304 can include markings 310, 312, 314 including, for example, branding information regarding the electronic marketplace or a third-party partner. Perforations and/or cut lines 316 can be provided in one or more of the surfaces 302, 304 of the transformable shipping container in order to define parts of the toy 340. In some cases, some portion of the markings 310, 312, 314 are positioned relative to the perforations or cut lines 316 such that some or all of the markings will appear on the resulting toy 340. The perforations or cut lines 316 can be visible from inside and outside the transformable shipping container 300, or might only be visible from an interior 320 of the container. The transformable shipping container 300 can also include printed instructions 322, which can be located on an interior 320 of the container, and may further include an interior package 324 containing additional parts 326, 328 (e.g., a propeller 326 and a shaft 328 for attaching the propeller) for use in producing the toy 340. In some cases, the instructions 322 can include instructions to have a user-supplied item added to the transformed state, such as a common household item, for additional parts. The toy 340 produced from the exemplary transformable shipping container 300 resembles a toy airplane having a fuselage 330, a wing 334, a tail 332, the propeller 326, and the shaft 328. Many other toys can be produced from a transformable shipping container using similar approaches to those described above. In some cases, markings 310, 312 from the original transformable shipping container 300 are prominently positioned on the resulting toy 340, so as to reinforce a positive brand association.

Figure 4:
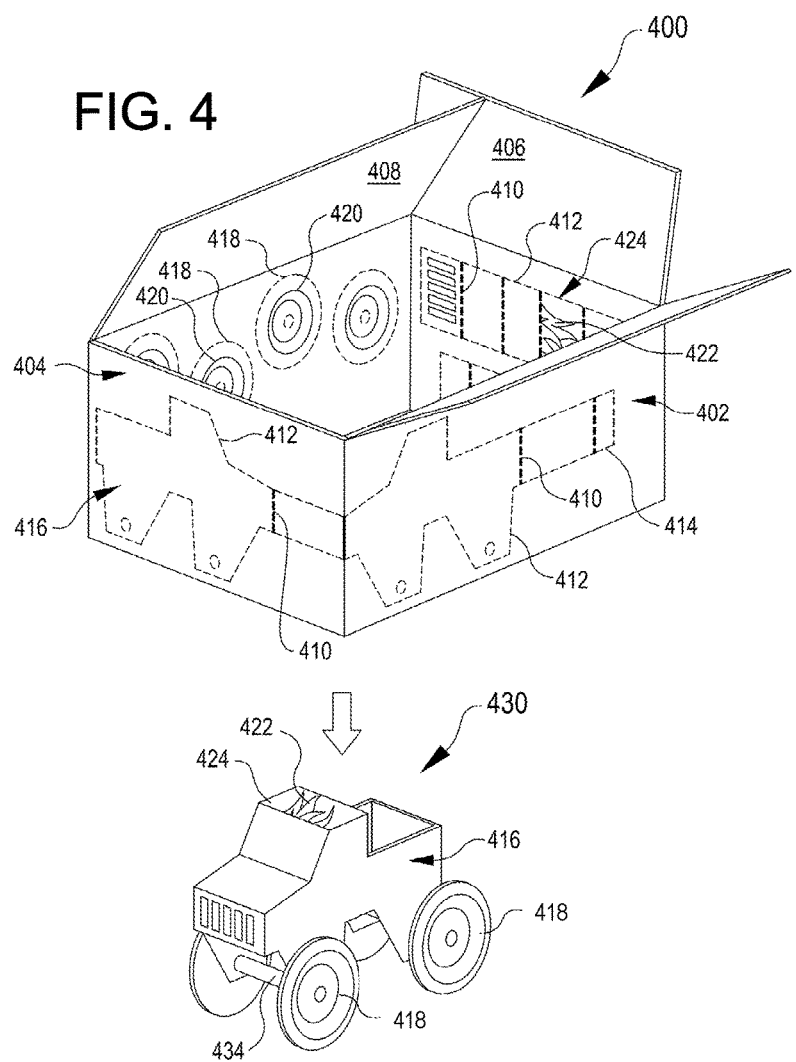
FIG. 4 illustrates another transformable shipping container configured to be transformed into a toy.

FIG. 4 illustrates another transformable shipping container 400, which can be transformed into a complex toy 430, e.g. a toy truck. The transformable shipping container 400 includes long sides 402, short sides 404, and short and long flaps 406, 408 similar to conventional shipping containers. The transformable shipping container 400 can further include demarcations 410 defining members of the toy 430. In this example, markings and/or perforations can define fold lines 410 and cut lines 412 defining members of the toy 430. Illustrations 422 can illustrate aspects of the toy 430, for example, flames and a grill. Flaps 414 for gluing, taping, stapling or otherwise attaching together foldable parts of the toy 430 can also be provided within the cut lines 412. The parts of the toy 430 can be provided in multiple sections. For example, sections can include a top surface 424, a side surface 416, and wheels 418 defined by additional perforations or cut lines 420. In some cases, additional parts are used to construct the toy 430. The user-supplied items forming an additional part or parts may be made from any suitable items, such as a common household item. Common household items may include, e.g., tape, glue, staples, or other connectors. Common household items may also include waste cardboard. For example, an axle 434 may be formed by a paper towel roll tube, dowel, or other similar item. In some cases, additional parts are provided in the transformable shipping container 400.

Figure 5:
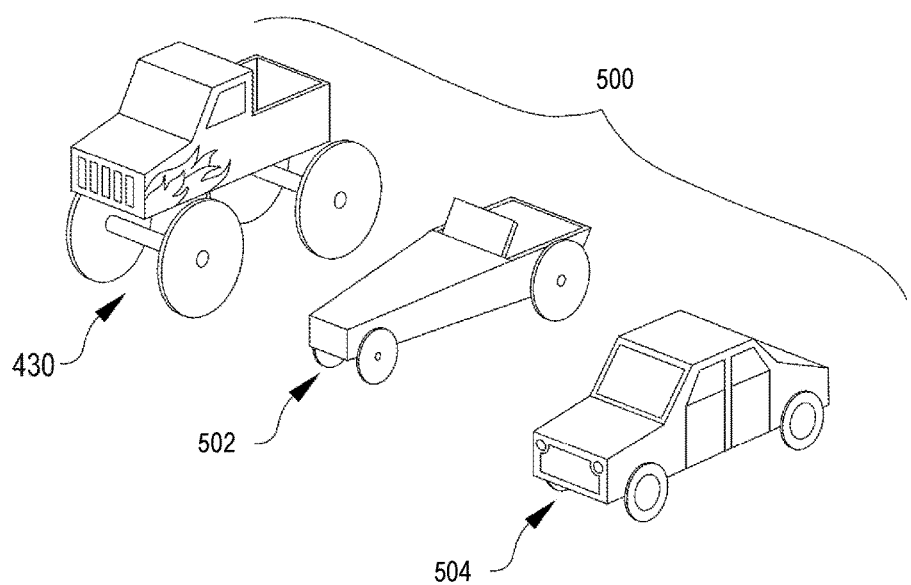
FIG. 5 illustrates a selection of collectible items based on transformable shipping containers.

Various transformable shipping containers that conform to a theme can be used to ship a customer order. For example, a set of transformable shipping containers can be provided that can be transformed into a respective set of collectible items, such as a set of related toys. For example, FIG. 5 illustrates a set 500 of collectible items that can be assembled from respective transformable shipping containers. By way of specific example, collectible items can include variations on a toy theme, such as toy automobiles. Exemplary collectible items in a toy automobile theme can include such items as a toy truck 430 (see FIG. 4), a toy dragster 502, and a toy car 504. Thus, variations in a theme may encourage customers to select a particular electronic marketplace based on the availability of such collectible items. Many other suitable collectible themes can be used.

Transformable shipping containers may appeal to a customer based on utility of the transformed state. In general, the utility of the transformed state relates to a purpose other than the shipping function of the shipping container. For example a transformed state can include a purpose driven item configured to provide utility to the customer different from that provided by the shipping container. Purpose driven items may include toys or play structures for children, as described above. Purpose driven items can also include various useful articles suitable for use with or in combination with other items or articles. For example, purpose driven items may include collectable items, or items that might be used as accessories for, or for displaying, products shipped in the transformable shipping containers.

Figure 6:
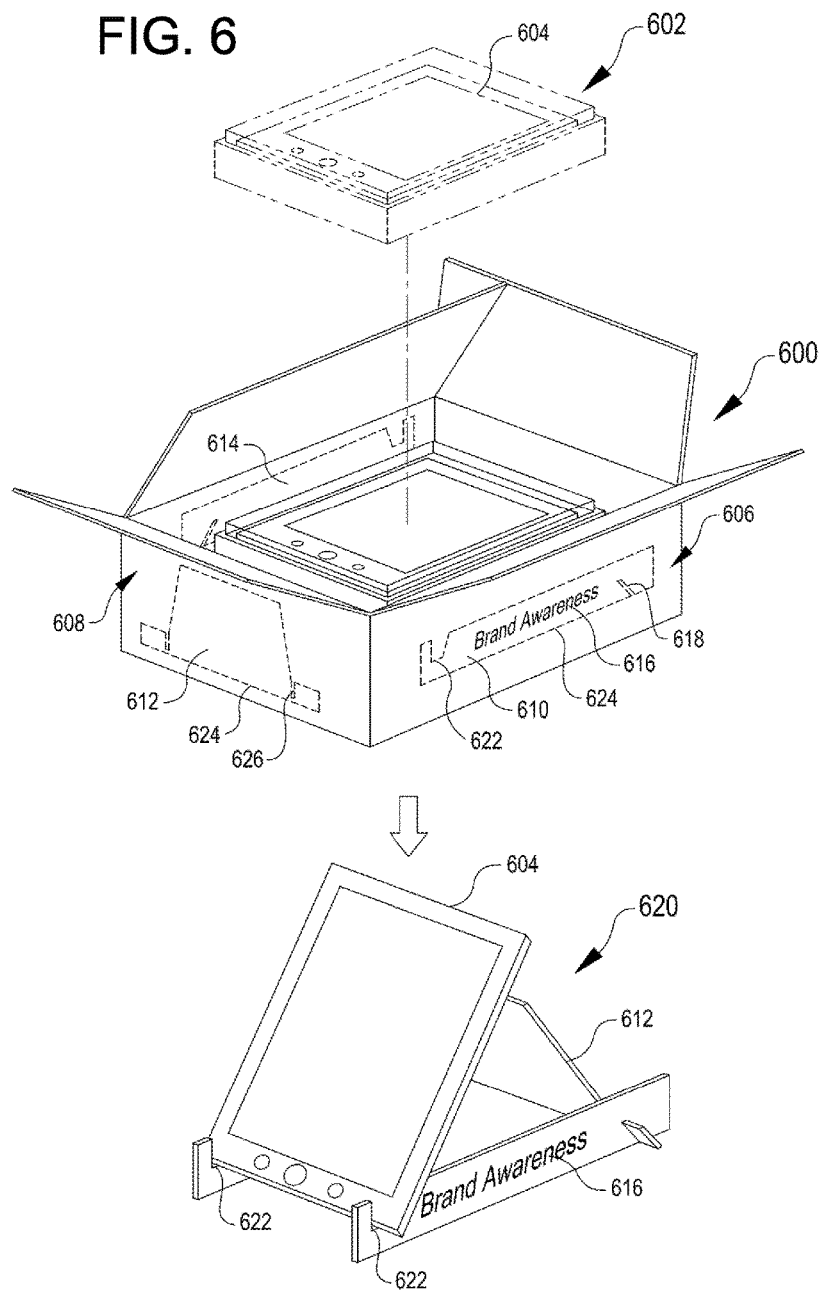
FIG. 6 illustrates a transformable shipping container configured to be transformed into a purpose driven item.

For example, FIG. 6 illustrates a transformable shipping container 600, which can be transformed into a purpose driven transformed state 620, (e.g. a tablet stand,) in accordance with embodiments. The transformable shipping container 600 can be used for shipping an item related to the transformed state (e.g. a tablet 604 within an inner pack 602). The container 600 can include first surfaces 606 and second surfaces 608 defining the container, with removable portions 610, 612, 614 of the surfaces defining the transformed state 620. The surfaces 606, 608 may include branding 616, which can be spatially configured on the container 600 to align with one or more of the removable portions 610, 612, 614. The removable portions 610 can be defined by cut lines or perforations 624, which can further define structural features such as notches 618, 622, and 626. When the removable portions 610 are removed from the surfaces 606, 608 of the container 600, they can be assembled together, e.g. via a subset of structural features 618, 626 to create the transformed state 620, which can be configured for an intended purpose. In this example, the transformed state 620 is shown in the form of a tablet stand supporting the tablet 604. Various other forms of purpose driven transformations are possible.

Figure 7:
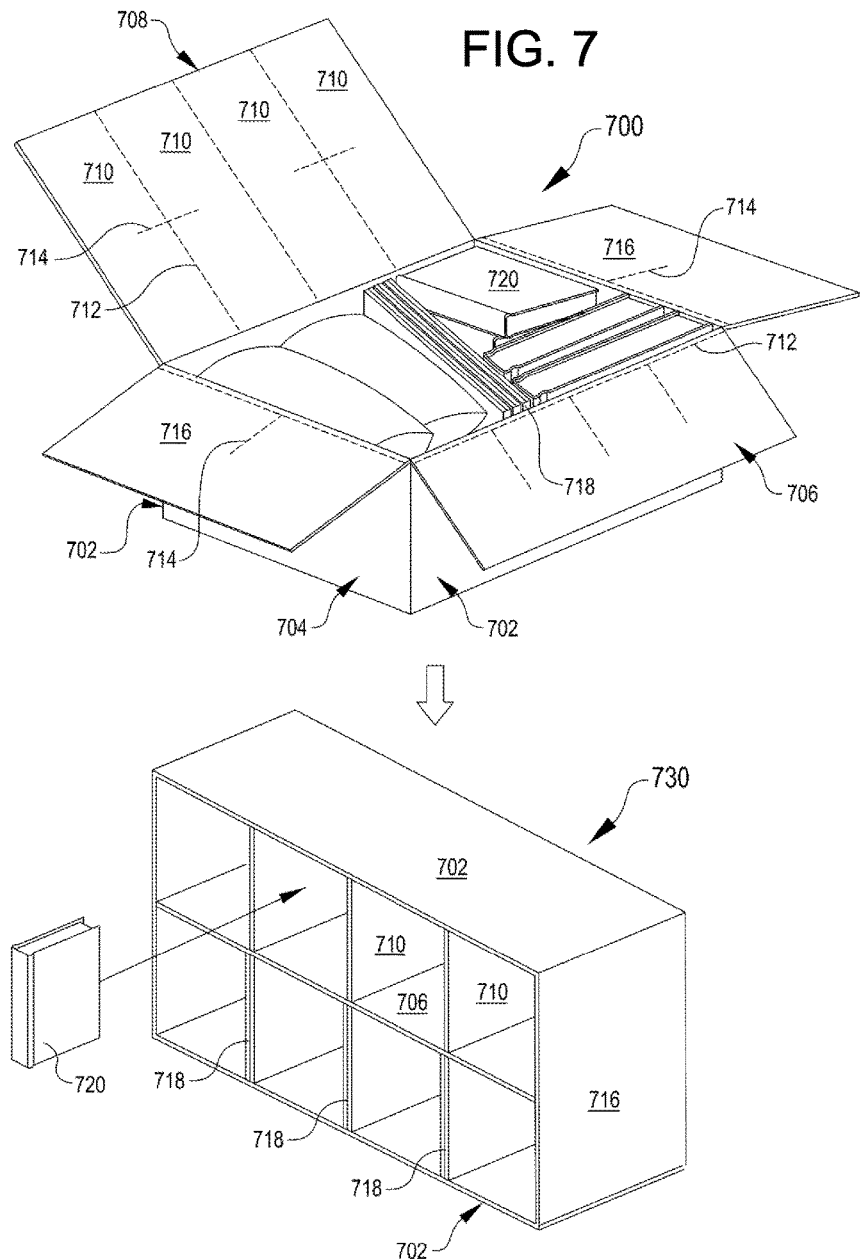
FIG. 7 illustrates a transformable shipping container configured to be transformed into a temporary storage shelf.

For example, a purpose driven transformation of a transformable shipping container can be used to create storage for shipped items. FIG. 7 illustrates a transformable shipping container 700, which can be transformed into a bookshelf 730, in accordance with embodiments. This exemplary transformable shipping container 700 can be directed to purchasers of large volumes of physical books, such as college students or collectors, or may be provided in response to any other suitable criteria. In accordance with embodiments, the transformable shipping container 700 can include long surfaces 702, short surfaces 704, short flaps 716, and long flaps 706, 708.

In some cases, one or more flaps, such as long flap 708, include additional material beyond what is normally included in a conventional shipping container of the same size to facilitate transformation of the shipping container 700 into the bookshelf 730. The transformable shipping container 700 can be divided via perforations or cut lines 712, 714 to form the parts of the bookshelf 730. For example, the larger long flap 708 may be subdivided into a set of upright supports 710, while long and short surfaces 702, 704 and smaller long flap 706 may define the body of the bookshelf 730 and a central shelf 706. Additional material can be provided for reinforcing the bookshelf 730 in the form of rigid dunnage 718, which can be reinforced cardboard or any other suitable lightweight packaging material. Preferably, the bookshelf 730 created from the transformable shipping container 700 is sized to support one or more books 720 or other items, which may include books or items shipped within the transformable shipping container 700. A non-exhaustive list of some other examples of purpose driven items may include: a reusable carrying case, e.g. with transformable closure and handling features, a temporary display or storage shelf tailored for kitchen implements, or the like.

In some cases, the transformable shipping container itself may include a reinforcement. The reinforcement can include any suitable change in the walls or flaps of the transformable shipping container that offsets a loss of rigidity associated with perforated sections that contribute to the transformable design. For example, a panel with perforations may be constructed of a more durable grade of cardboard than other walls of the shipping container. A panel with perforations may be constructed with additional layers of cardboard included in the panel, or attached with other portions of the shipping container. For example, some reinforced transformable shipping containers may include thickened or layered cardboard sections at the corners of the containers.

Figure 8:
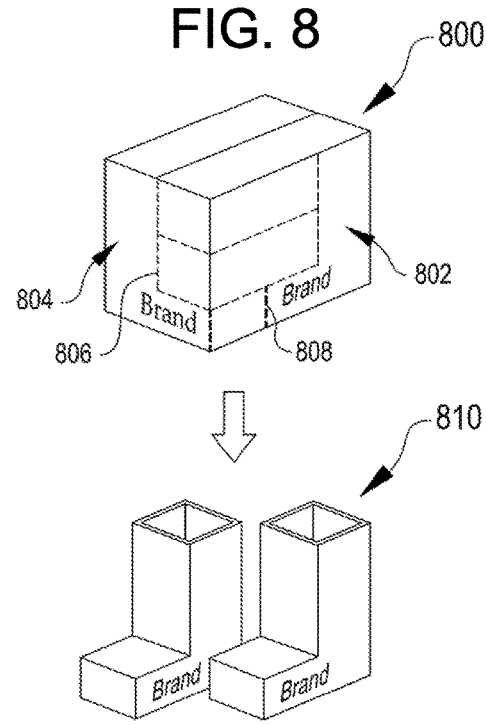
FIG. 8 illustrates a transformable shipping container configured to be transformed into a first item of a set.
Figure 9:
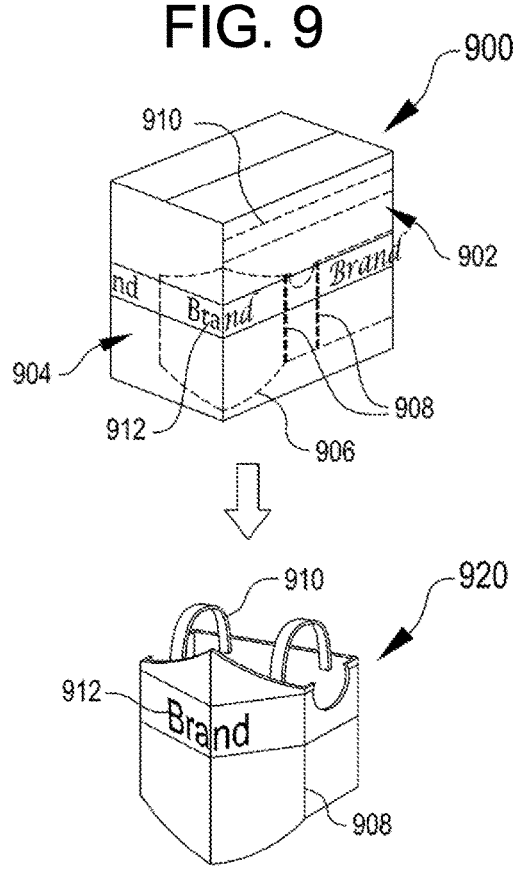
FIG. 9 illustrates a transformable shipping container configured to be transformed into a second item of the set complimenting the item of FIG. 8.
Figure 10:
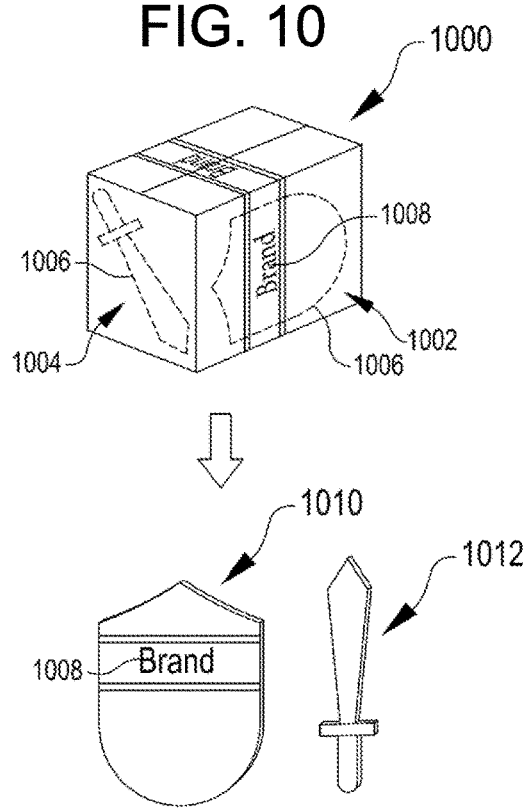
FIG. 10 illustrates a transformable shipping container configured to be transformed in a third item of the set complimenting the items of FIGS. 8-9.

Some transformations can include aspects of purpose driven and collectible items, in accordance with embodiments. For example, FIGS. 8-10 illustrate collectible parts for a wearable costume formed from multiple transformable shipping containers. FIG. 8 illustrates a first collectible transformable shipping container 800 configured to transform into a first part of a wearable costume. The first collectible transformable shipping container 800 can have a first set of sides 802 and a second set of sides 804, with a plurality of demarcations 806, 808 thereon indicating perforations, fold lines, cut lines, or any suitable combination thereof, such that the first transformable shipping container 800 can be transformed into a pair of cardboard greaves 810. FIG. 9 illustrates a second collectible transformable shipping container 900 configured for transforming into cardboard armor 920. The container 900 can have a first set of sides 902, a second set of sides 904, and a plurality of demarcations 906, 908 indicating cut lines, perforations, and/or fold lines for facilitating a transformation of the container 900 into the cardboard armor 920. The container 900 can include one or more adhesive strips 910 for creating flexible securements for the cardboard armor 920. In some cases, a brand label 912 may be arranged on the container 900 such that the brand label is prominently positioned on the cardboard armor 920. FIG. 10 illustrates a third collectible transformable shipping container 1000 configured for transforming into a cardboard sword 1012 and shield 1010. The third collectible container 1000 can include a first set of sides 1002 and a second set of sides 1004, with a plurality of demarcations 1006 including cut lines and/or perforations defining the sword 1012 and shield 1010. In some cases, a brand label 1008 may be arranged on the container 1000 such that one or both of the sword and shield 1012, 1010 may have the brand label prominently arranged thereon.

Figure 11:
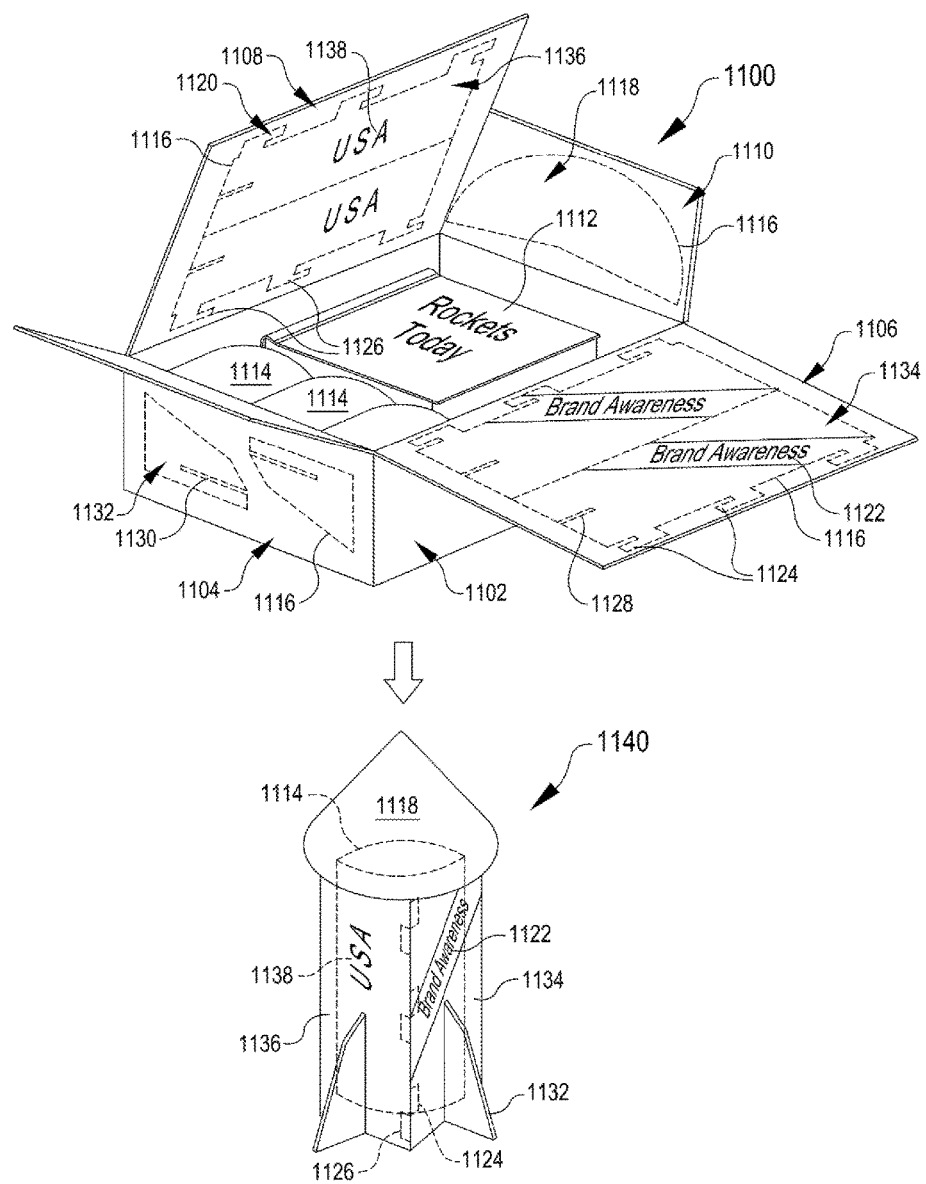
FIG. 11 illustrates a transformable shipping container configured to be transformed into a toy based on contents of the shipping container.

Various other transformations may include complex collectible items associated with product categories. By way of example, FIG. 11 illustrates a transformable shipping container 1100 configured to transform into a model rocket 1140, in accordance with embodiments. The transformable shipping container 1100 may be associated with products that define a category of interest, such as space, rocketry, aeronautics, or the like. For example, a transformable shipping container 1100 defining a model rocket 1140 can be selected for shipping a rocketry text 1112 or related product. The transformable shipping container 1100 can include a first set of sides 1102, a second set of sides 1104, a first large flap 1106, a second large flap 1108, and a small set of flaps 1110. The sides and flaps of the transformable shipping container 1100 can include demarcations including cut lines, perforations, and fold lines 1116 configured to define parts of the model rocket 1140. Some exemplary parts of the model rocket 1140 can include a cap 1118, sides 1134, 1136, and fins 1132. In some aspects, the demarcations can define grooves 1128, 1130 and tabs 1124, 1126 for joining parts of the rocket 1140. The transformable shipping container 1100 can also include various illustrative decals, some of which may include branding 1122, and some of which may include topical illustrations or logos 1138 related to the transformed state of the container, e.g. a "U.S.A." banner for the model rocket 1140. Some complex collectible items may require additional interior support, in which case, a transformable shipping container 1100 may be filled with a predetermined quantity of dunnage 1114, such as inflatable air bags, suitable for supporting the collectible item.

The exemplary transformable shipping containers illustrated above with respect to FIGS. 2-11 are intended to describe various aspects of transformable shipping containers, and do not limit the scope of this disclosure to only the aforementioned embodiments of transformable containers. Many variations on transformable shipping containers are possible based on the above-described techniques. Various forms of transformable shipping containers can be selected for use in fulfilling a customer order based on, for example, attributes of the order, attributes of the customer, or other suitable factors. Selection of a transformable container can be determined by a computer system, such as the electronic marketplace 102 (FIG. 1), at a time that a customer places an order, or based on determining that a customer has placed an order.

Figure 12:
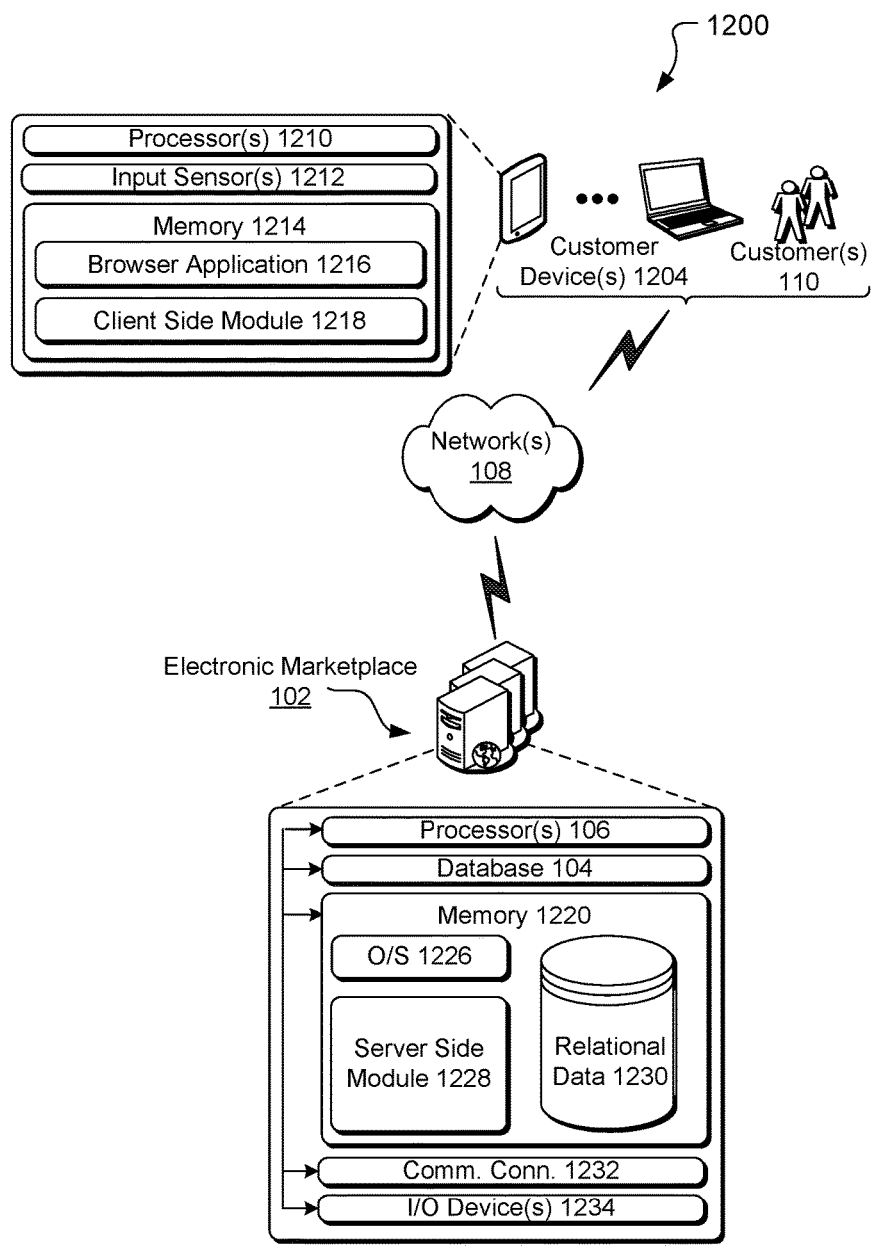
FIG. 12 illustrates an exemplary system for communicating order information between a user and an electronic marketplace.

FIG. 12 illustrates an exemplary system 1200 for communicating order and/or customer information between a customer 110 and the electronic marketplace 102. The customer 110 can input information defining an order via a customer device 1204, which may be any suitable client-side device such as a tablet, smartphone, personal computer, or comparable device. The customer device 1204 can include a processor 1210, input sensors 1212 such as a keyboard or touch screen, and memory 1214. The processor and memory can operate any suitable means for facilitating electronic communication between the customer device 1204 and the electronic marketplace 102. Exemplary means for facilitating this communication can include a browser application 1216 and/or a client side module 1218, e.g. an application configured to interact with the electronic marketplace 102. The customer device 1204 can communicate information with the electronic marketplace 102 via a network 108.

Figure 15:
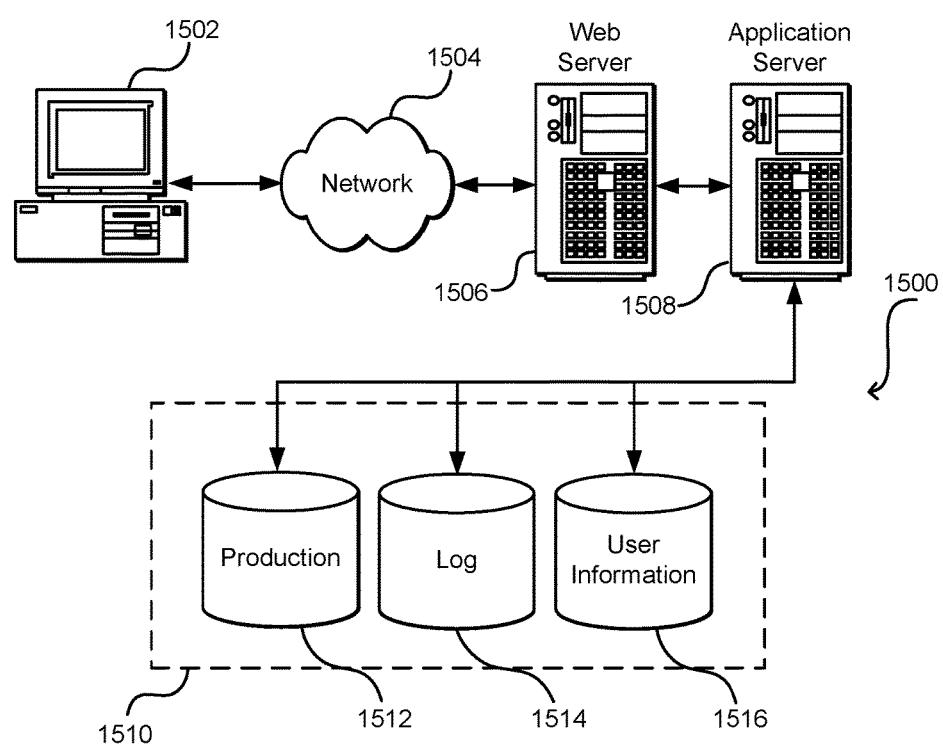
FIG. 15 illustrates an environment in which various embodiments can be implemented.

The electronic marketplace 102 can include any suitable means for storing information regarding products for sale and facilitating customer orders. The electronic marketplace can include, for example, a processor 106, a database 104, and memory 1220 configured to facilitate customer orders. The memory 1220 can further be configured with an operating system 1226 for providing executable program instructions for the general administration and operation of the electronic marketplace 102, a server side module 1228 for communicating with the client side module 1218, and store of relational data 1230 which can store information regarding the order, the customer, and other suitable operational data in memory. The electronic marketplace 102 can further include a communication connection 1232 for facilitating communication with the customer device 1204, and one or more I/O devices 1234 for facilitating modification of content at the electronic marketplace, e.g., adding libraries of available transformable shipping containers and parameters for selecting said containers. Further aspects of the electronic marketplace are discussed below with regard to the example environment 1500 (FIG. 15). In particular, the electronic marketplace 102 can facilitate the presentation of a graphical interface to a customer 110.

Figure 13:
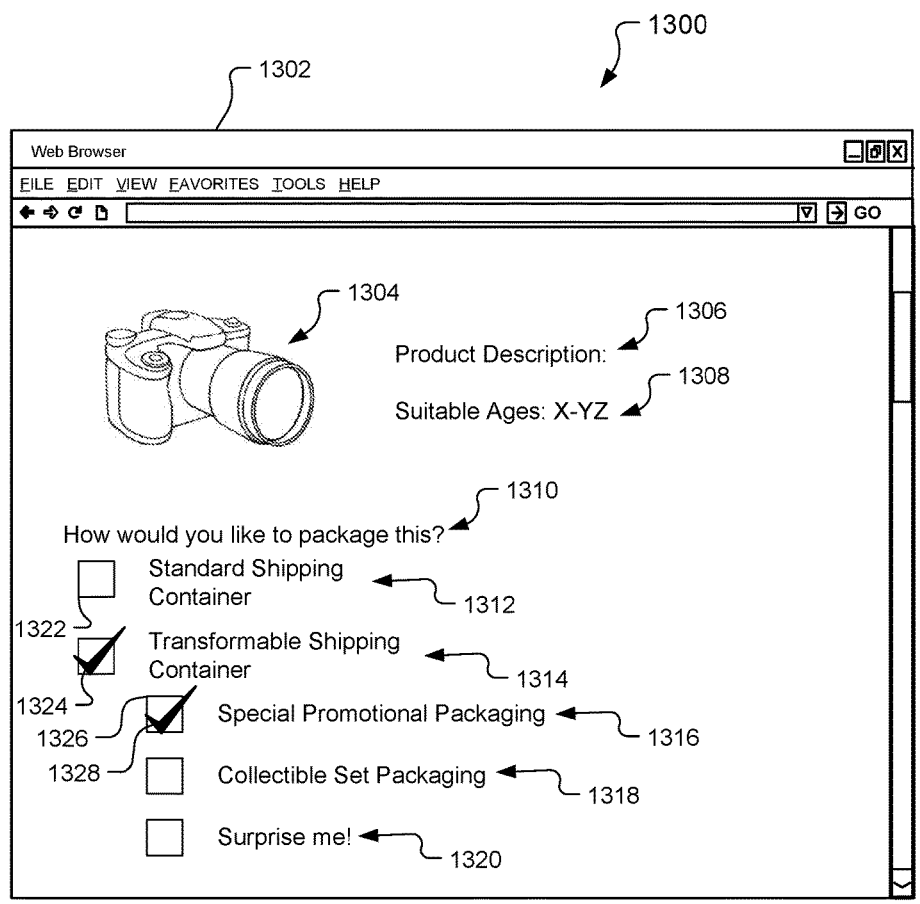
FIG. 13 illustrates an exemplary graphical user interface for facilitating a transformable shipping container selection by a user.

FIG. 13 illustrates an exemplary graphical user interface 1300 for presentation to a customer, in accordance with embodiments. The graphical user interface (GUI) 1300 is configured to display information concerning a product and to prompt a customer to indicate a packaging preference. In embodiments, the GUI 1300 can include a browser or application window 1302, within which various attributes of a product can be displayed. For example, a product image 1304 may be displayed, along with a product description 1306, and relevant information about the product such as class of selection information, e.g. suitable ages 1308. The GUI 1300 can include a query to the customer 1310 requesting preference information regarding a packaging option, and may present a plurality of options for selection. For example, options may include the option to use a standard shipping container 1312 or a transformable shipping container 1314, with corresponding buttons 1322 associated with the options. The customer can indicate a preference by selecting the preferred option, which can cause an indicator 1324 to appear which illustrates the current selection. In some cases, additional nested options 1316, 1318, 1320 may appear based on the current selection, along with additional corresponding buttons 1326 for indicating a specific preference, which may be indicated by a second indicator 1328. In some cases, if a transformable shipping container option is selected, a default nested option may be automatically selected, such as an option to select a special promotional packaging 1316, or other suitable option.

Some or all of the process 1400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 14:
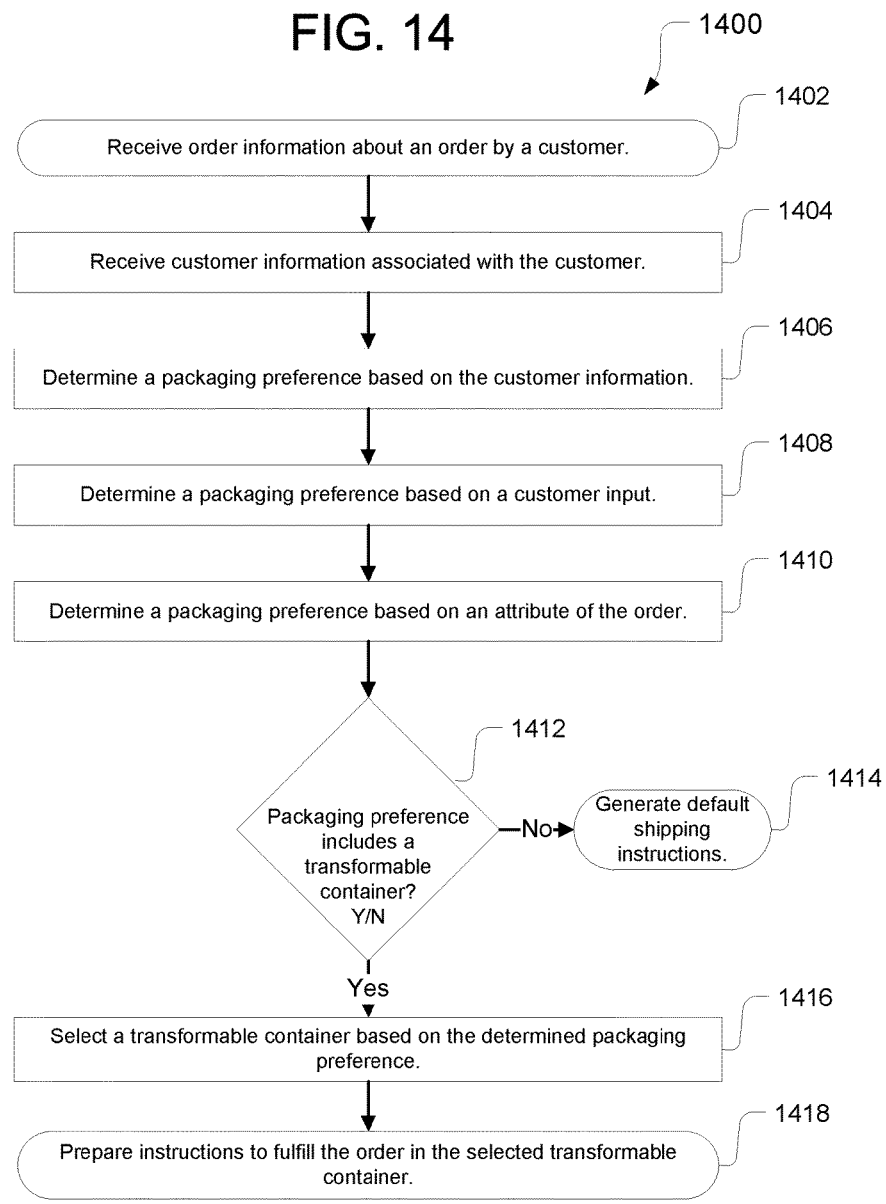
FIG. 14 illustrates a process for selecting a transformable shipping container.

FIG. 14 shows an example process 1400 for designating a transformable shipping container. The process 1400 may be implemented in conjunction with, for example, the system 100 of FIG. 1. In the process 1400, order information can be received from a customer (act 1402). In some cases, the order can be an incomplete order, such as an order at a checkout screen in an electronic marketplace. In some cases, the order may include multiple items, and the order information can reflect, for example, categorical information regarding the items in the order. In some cases, categorical information regarding items in the order can include a class of selection reflecting suitability of an item for a recipient or an audience. For example, class of selection can include whether a product is generally designated for boys, girls, or both, such as boys' and girls' toys or costumes. Class of selection can also include whether a product is determined suitable for various ages, such as a toy suited for an age range. For example, some products with parts deemed a choking hazard may be restricted to children of a certain age and above. Categorical information regarding items in the order can also include specific information regarding the use of a product. For example, although subject matter may differ, books may be generally categorized together, electronic devices may be categorized together, and other suitable groupings based on item characteristics and intended use. Order information can also include information about the cumulative size of the order and the geometry of the products therein. For example, order information can reflect a container size or a container weight capacity required to ship the cumulative order.

Next, customer information can also be received associated with the customer placing the order (act 1404). Customer information can include an order history, such as a frequency associated with orders of various specific items, or an order frequency associated with items according to categorical information regarding the items. For example, customer information can include whether a customer is likely to have children based on a history of ordering children's toys. Customer information may include whether a customer has a predisposition to certain product types as well. For example, the customer may be likely to be an early adopter of electronics based on a history of ordering electronics. Furthermore, customer information may also include a predetermined selection regarding transformable shipping containers. For example, a customer preference to receive a transformable container may be stored with a customer profile. In some cases, the preference to receive the transformable container may be determinable by the customer at the electronic marketplace, or the preference to receive the transformable container may be associated with a status of the customer, e.g. a membership.

A transformable shipping container selection may be based on a packaging preference. The packaging preference can be determined based on one or more inputs. For example, a packaging preference can be determined based on customer information (act 1406). For example, one or more transformable shipping container options may be suitable for children, and one or more other options, or a default option of a standard shipping container, may be more suitable for adults. In such cases, a transformable shipping container option that is suitable for children may be selected if it is detected that the customer has children or is likely to have children. In some cases, a customer preference may be stored, in which case the customer preference can be accessed and a suitable packaging preference may be selected based on the stored customer preference. For example, a customer may be initially prompted whether to receive a transformable shipping container with subsequent orders and the system may retrieve the indicated preference on demand. In some cases customer information can include a membership status, and a packaging preference for a transformable container may be selected based on the customer having a particular membership status.

A packaging preference may also, or alternatively, be selected based on a customer input (act 1408). For example, the system may prompt the customer to select a particular packaging preference at a checkout screen (see FIG. 13). The selection of packaging preferences made available for a customer to select may depend in part on attributes of the order, such as a size of the shipping container needed for fulfilling the order. For example, when a large order has been assembled, a transformable shipping container option may include only large containers, which may limit the set of available transformed states to large transformed states. When a small order has been assembled, a transformable shipping container option may include only small containers and the concomitant small transformed states.

A packaging preference may also, or alternatively, be selected based on an attribute of the order (act 1410). For example, various transformable shipping containers may be selected based on a class of selection of one or more items in the order. Where an order contains items for a particular class of user, e.g. a toy for a child of a specific age range, a transformable shipping container may be selected that transforms into a toy that is also suitable for an age in that specific age range. Where an order contains items in a particular class of item, the transformable shipping container may be selected based on that class of item. For example, when an order contains books, the selected transformable shipping container may be a purpose driven container that transforms into a bookshelf. When an order contains a display device such as a tablet, the shipping container may be one that transforms into a tablet stand. Various other purpose driven transformed states are possible within the scope of this disclosure. A transformable shipping container may be configured to transform into any suitable item according to a suitable attribute of the contents of the order, such as a collectible item associated with the subject matter of the contents of the order. In some cases, a transformable shipping container selection may be driven by a size of a container needed for shipping the order. For example, various transformable shipping containers or sets of containers may only be available when an order is a correct size to use a shipping container of particular dimensions.

If a packaging preference for a transformable shipping container is not determined (act 1412), default shipping instructions may be provided which conform to standard shipping methods (act 1414). Otherwise, a transformable shipping container option may selected based on the packaging preference (act 1416) and instructions may be prepared to cause the fulfilment of the order using the selected transformable shipping container option (act 1418). In various alternative embodiments, selection of a transformable shipping container may be driven in part by considerations other than customer or order information. For example, during a holiday season, a transformable shipping container option may be provided wherein the transformed state is related to the holiday. By way of further example, a transformable shipping container option may be provided wherein the transformed state is related to a third party partner, e.g. by transforming into a promotional item or promotional toy associated with the third party partner, such as a figure based on a movie or media release, or other suitable item or promotional toy.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
converting a shipping container having a plurality of walls into a transformable shipping container having a transformable shipping container configuration by the addition of at least one fold line, cut line, or perforation to one or more of the plurality of walls, the at least one fold line, cut line, or perforation configured to facilitate conversion of the transformable shipping container by an end recipient into a transformed state; wherein a utility of the transformed state relates to a purpose other than a shipping function of the shipping container; and
in response to a purchase of one or more items by a customer of an electronic marketplace,
retrieving customer information associated with the customer, the customer information including an order history associated with one or more products among present and past customer orders;
selecting the transformable shipping container configuration from a plurality of available transformable shipping container configurations based at least in part on the one or more products among the present and past customer orders of the order history;
generating instructions to cause placement of the purchased one or more items into a transformable shipping container having the selected transformable shipping container configuration; and
initiating shipment of the transformable shipping container containing the purchased one or more items to the customer.

2. The method of claim 1, further comprising:
detecting a container preference of the customer, the container preference pertaining to the plurality of available transformable shipping container configurations; and
selecting the transformable shipping container configuration from the plurality of available transformable shipping container configurations based at least in part on the container preference of the customer.

3. The method of claim 1, further comprising:
determining, based on the one or more products among present and past customer orders of the order history, a customer category of the customer; and
selecting the transformable shipping container configuration based at least in part on the customer category of the customer.

4. The method of claim 1, further comprising:
determining, based on the order history, that the customer has received a first transformable shipping container; and
selecting the transformable shipping container configuration based at least in part on the first transformable shipping container.

5. The method of claim 1, further comprising:
generating instructions to cause dynamic preparation of the transformable shipping container based at least in part on the selected transformable shipping container configuration.

6. The method of claim 1, further comprising:
receiving order information concerning a physical parameter of the purchased one or more items; and
selecting the transformable shipping container configuration based at least in part on the physical parameter of the purchased one or more items.

7. The method of claim 1, further comprising:
selecting a subset of transformable shipping container configuration options from the plurality of available transformable shipping container configurations based at least in part on the order history;
generating instructions to present to the customer the subset of predetermined transformable shipping container configuration options;
receiving selection information concerning a customer selection of a transformable shipping container configuration option from the subset; and
selecting the transformable shipping container configuration based at least in part on the customer selection.

8. The method of claim 7, further comprising:
receiving order information concerning a parameter of the purchased one or more items; and
determining a customer category based in part on the order history;
selecting the subset of transformable shipping container configuration options based at least in part on the customer category.

9. The computer-implemented method of claim 1, further comprising converting the transformable shipping container into the transformed state.

10. The computer-implemented method of claim 1, further comprising:
determining, based on the order history, a likelihood that the customer has children; and selecting the transformable shipping container configuration from a subset of the plurality of available transformable shipping container configurations suitable for children.

11. The computer-implemented method of claim 1, further comprising:
determining, based on the order history, an item category corresponding to an item among the one or more items purchased by the customer; and
selecting the transformable shipping container configuration based on the item category.

12. The computer-implemented method of claim 1, further comprising:
selecting the transformable shipping container configuration in response to detecting, in the order history, a specific item among the one or more items purchased by the customer that corresponds to the transformable shipping container configuration.

13. The computer-implemented method of claim 1, further comprising selecting the transformable shipping container based on one or more past customer orders of the order history.

14. A computer-implemented method comprising:
in response to a purchase of one or more items by a customer of an electronic marketplace, retrieving customer information associated with the customer, the customer information including an order history associated with one or more products among present and past customer orders;
selecting a transformable shipping container configuration from a plurality of available transformable shipping container configurations based at least in part on the one or more products among present and past customer orders in the order history, each one of the plurality of available transformable shipping container configurations corresponding to a shipping container having a plurality of walls and at least one added fold line, cut line, or perforation to one or more of the plurality of walls, the at least one fold line, cut line, or perforation configured to facilitate conversion of the transformable shipping container by an end recipient into a transformed state, wherein a utility of the transformed state relates to a purpose other than a shipping function of the shipping container;
generating instructions to cause placement of the purchased one or more items into a transformable shipping container having the selected transformable shipping container configuration; and
initiating shipment of the transformable shipping container containing the purchased one or more items to the customer; and
converting the transformable shipping container into the transformed state.

15. The computer-implemented method of claim 14, further comprising:
determining, based on the order history, that the customer has received a first transformable shipping container; and
selecting the transformable shipping container configuration based at least in part on the first transformable shipping container.

16. The computer-implemented method of claim 14, further comprising selecting the transformable shipping container configuration based at least in part on the one or more products among the present and past customer orders of the order history.

17. The computer-implemented method of claim 14, further comprising:
determining, based on the order history, an item category corresponding to an item among the one or more items purchased by the customer; and
selecting the transformable shipping container configuration based on the item category.

18. The computer-implemented method of claim 14, further comprising selecting the transformable shipping container based on one or more past customer orders of the order history.

19. The computer-implemented method of claim 14, further comprising:
determining, based on the one or more products among present and past customer orders of the order history, a customer category of the customer; and
selecting the transformable shipping container configuration based at least in part on the customer category of the customer.

20. The computer-implemented method of claim 14, further comprising:
receiving order information concerning a container size requirement for fulfilling the one or more items; and
selecting the transformable shipping container configuration based at least in part on the container size requirement.

21. A computer-implemented method comprising:
converting a shipping container having a plurality of walls into a transformable shipping container having a transformable shipping container configuration by the addition of at least one fold line, cut line, or perforation to one or more of the plurality of walls, the at least one fold line, cut line, or perforation configured to facilitate conversion of the transformable shipping container by an end recipient into a transformed state; wherein a utility of the transformed state relates to a purpose other than a shipping function of the shipping container; and
in response to a purchase of one or more items by a customer of an electronic marketplace,
retrieving customer information associated with the customer, the customer information including an order history associated with one or more past customer orders;
determining, based on the order history, that the customer has received a first transformable shipping container;
selecting the transformable shipping container configuration based at least in part on the first transformable shipping container;
generating instructions to cause placement of the purchased one or more items into a transformable shipping container having the selected transformable shipping container configuration; and
initiating shipment of the transformable shipping container containing the purchased one or more items to the customer.

* * * * *